May 2, 1950  J. HOHL ET AL  2,506,363
VACUUM SEALING MACHINE
Filed Jan. 11, 1945  4 Sheets-Sheet 1

Inventors
JOHN HOHL
H.A. BARNBY
J.M. WHEATON

By Rule and Hoge
Attorneys

Inventors
JOHN HOHL
H. A. BARNBY
J. M. WHEATON

May 2, 1950 J. HOHL ET AL 2,506,363
VACUUM SEALING MACHINE
Filed Jan. 11, 1945 4 Sheets-Sheet 4

Inventors
JOHN HOHL
H. A. BARNBY
U. M. WHEATON
By Rule & Hoge,
Attorneys

Patented May 2, 1950

2,506,363

UNITED STATES PATENT OFFICE 2,506,363

VACUUM SEALING MACHINE

John Hohl, Herbert A. Barnby, and Jack M. Wheaton, Toledo, Ohio, assignors to Owens-Illinois Glass Company, a corporation of Ohio Application January 11, 1945, Serial No. 572,352

15 Claims. (Cl. 226—116)

Our invention relates to machines for vacuumizing and sealing jars and other containers and is embodied in a machine of the type comprising means for drawing a partial vacuum in the containers, after they have been filled with food products or other commodities, and thereafter positioning and tightening the closure devices or caps for sealing the containers. The invention in its preferred form is embodied in a machine comprising sealing units or heads, each including vacuumizing and cap tightening means, mounted on a carriage rotatable about a vertical axis, the machine also comprising vertically movable supports on which the containers, with the caps resting loosely thereon, are placed and by which the containers are lifted into operative relation to the sealing units.

An object of our invention is to provide novel and practical means for preventing the operation of a sealing head or opening of the suction line thereto when a container is missing from such head.

A further object is to prevent the opening of a valve for applying suction when a closure cap is missing. More particularly, an object of the invention is to provide a detector which indicates the presence at or absence from a sealing head, of a container or a closure cap therefor, and valve means under the control of such detector for controlling the application of suction within said head.

A further object of the invention is to provide a novel form of chuck for lifting a cap from a container and holding it in open position with respect to the container during the vacuumizing of the latter and thereafter applying the cap to the container and thereby sealing the container.

A further object of the invention is to provide, in a machine of the character indicated, a magnetic chuck for lifting and holding a cap during the vacuumizing of a container and while applying the cap to the container.

Other objects of our invention will appear hereinafter.

Referring to the accompanying drawings which illustrate a machine embodying our invention:

Figure 1:
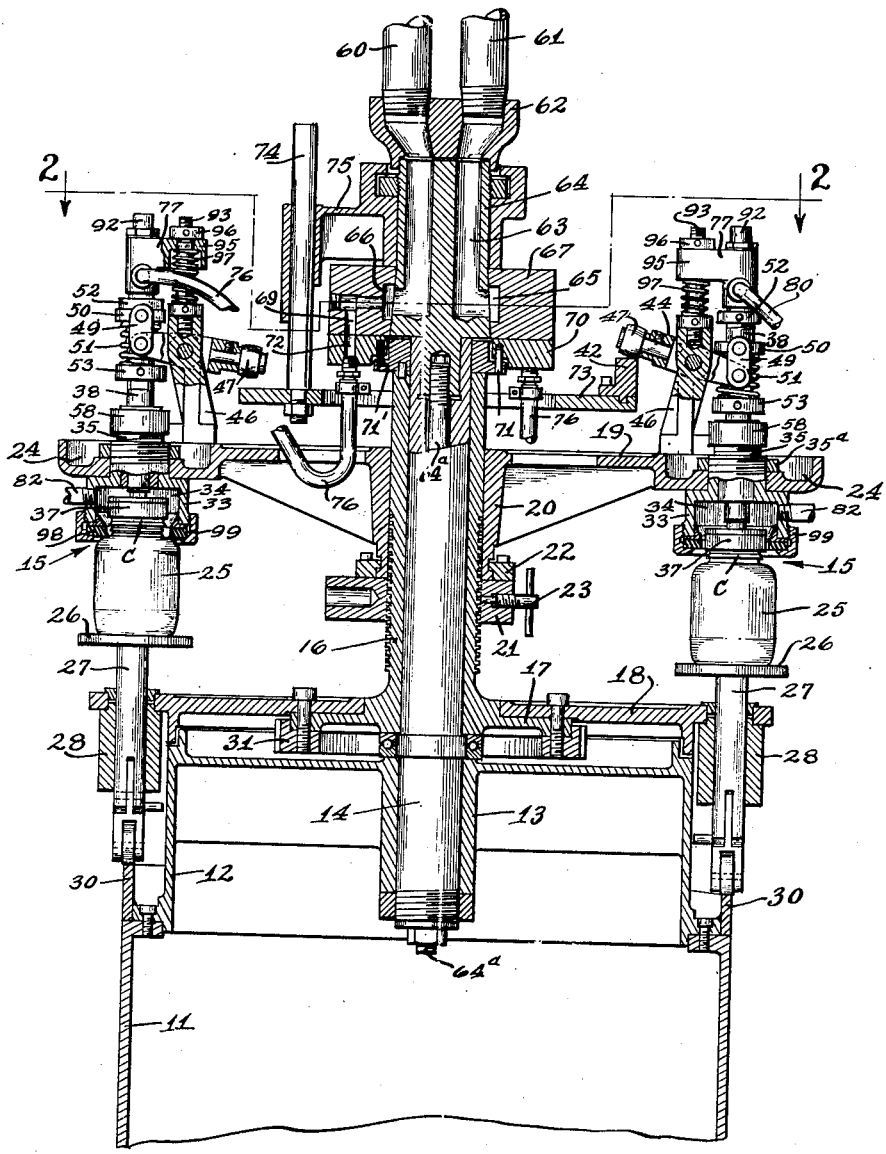
Fig. 1 is a sectional elevation of the machine, with parts broken away, the section being taken substantially at the line 1—1 on Fig. 2.

Referring to Fig. 1, the machine framework comprises a circular base including a lower section 11 and an upper section 12 bolted thereto and formed with a central hub 13 in which a center post 14 is supported. Vacuumizing and sealing units 15 or heads, are arranged in an annular series and supported on a carriage which is mounted for rotation about the center column 14. The carriage includes a tubular shaft 16 surrounding the column and formed at its lower end with a flange 17 to which is bolted a platform 18. The carriage also includes an upper platform 19 formed with a hub 20 and mounted for up-and-down adjustment on the shaft 16. Means for supporting the platform 19 and adjusting it up and down includes a bearing ring 21 threaded on the shaft 16 and connected to the hub 20 by a flanged collar 22. A locking screw 23 secures the parts in adjusted position. The platform 19 is formed with integral recessed or cup-shaped holding sections 24 individual to the sealing units and by which said units are supported and adjustable up and down with the platform to accommodate the machine to containers of different heights.

The containers 25 are herein shown and referred to as jars, and the invention will be herein described as used for vacuumizing and sealing such jars when packed, for example, with coffee in granulated or powdered form. The invention, however, is not limited to this particular use or to this type of container.

Pedestals 27, each including a platform 26, provide supports for the jars 25, each pedestal being mounted for up-and-down movement in a bearing sleeve 28 secured to the underside of the platform 18. The pedestals are arranged directly beneath and in vertical alignment with the sealing units 15. The pedestals are supported on a stationary circular cam track 30 mounted on the machine base and surrounding the section 12 thereof.

The carriage is rotated continuously as by means of an electric motor having driving connections therewith through a train of gearing including a ring gear 31 bolted to the platform 18. The driving mechanism and also the parts thus far detailed by reference numerals may be the same as the corresponding parts disclosed in the patent to Hohl et al., No. 2,338,852, January 11, 1944, Vacuum sealing machine.

The sealing units 15 are all of the same construction. Referring to Figs. 3 to 6, each unit comprises a vacuum bell 33 providing a vacuum chamber 34. The bell is formed with a tubular hub 35 which extends upwardly through an opening in the holder 24, the bell being clamped to the underside of said holder by a nut 35ª threaded on the hub.

A chuck in the form of a plate 37 is mounted for up-and-down movement within the vacuum chamber and serves to hold a jar cap during the vacuumizing of the jar, and then serves as a pusher plate to force the cap downward into sealing engagement with the jar, as fully described hereinafter. The chuck includes gripping means for holding the caps C. Such means, as herein shown, comprises magnets 36 seated in recesses in the lower face of the chuck. The magnets are preferably in the form of disks arranged in a circle. The chuck is connected to the lower end of a vertical spindle 38 which extends through the hub 35 and is movable up and down therein. The connection between the chuck 37 and spindle includes a ball swivel member 39 having a shank 40 threaded into a bore in the spindle. The member 39 has a free connection with the chuck permitting tilting movement of the latter in any direction so that it may accommodate itself to a closure cap supported in an inclined position as hereinafter described. The chuck 37 is also free for a limited up-and-down movement relative to the spindle to adapt it to slight variations in the height of the jars.

Figure 6:
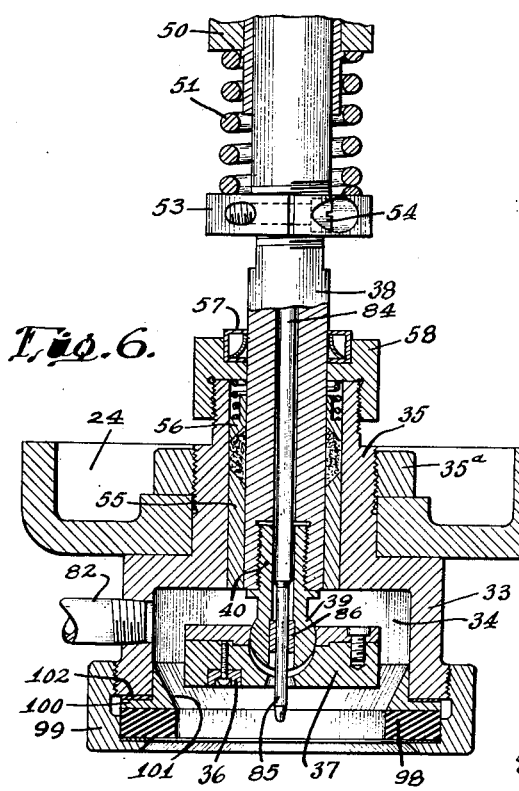
Fig. 6 is a fragmentary sectional elevation of the major portion of a sealing unit, being complemental to Fig. 5.
Figure 5:
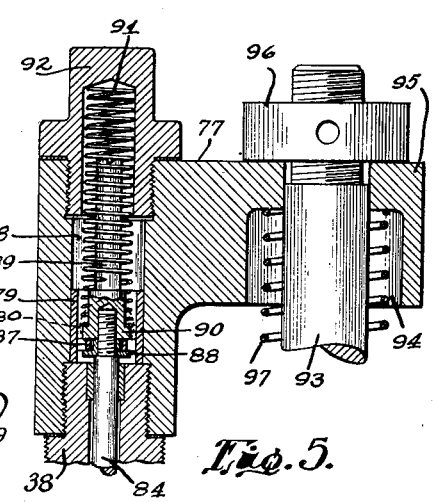
Fig. 5 is a sectional elevation on a larger scale of the upper portion of a sealing unit, showing particularly the suction control valve for said unit.

Means for moving the chucks up and down periodically as the carriage rotates, includes two stationary cams 41 and 42 (Fig. 2) operating through the following mechanism. Each unit includes a bifurcated lever 44 connected by a pivot 45 to a standard 46 mounted on the table 18. The lever carries a cam follower roll 47 which runs on the cams. Links 49 connect the lever 44 to a yoke 50 which is slidable up and down on the spindle 38. The yoke is normally held by a compression spring 51, against a nut 52 threaded on the spindle. The spring 51 is held under compression between the yoke 50 and a nut 53 threaded on the spindle. The nut 53 is adjustable up and down on the spindle for adjusting the compression of the spring and is held in adjusted position by a set screw 54 (Fig. 6). A bushing 55 and packing gland 56 are positioned within the hub 35. An oil seal 57, mounted in the cap 58 of the packing gland, prevents oil from entering and destroying the packing.

Figure 2:
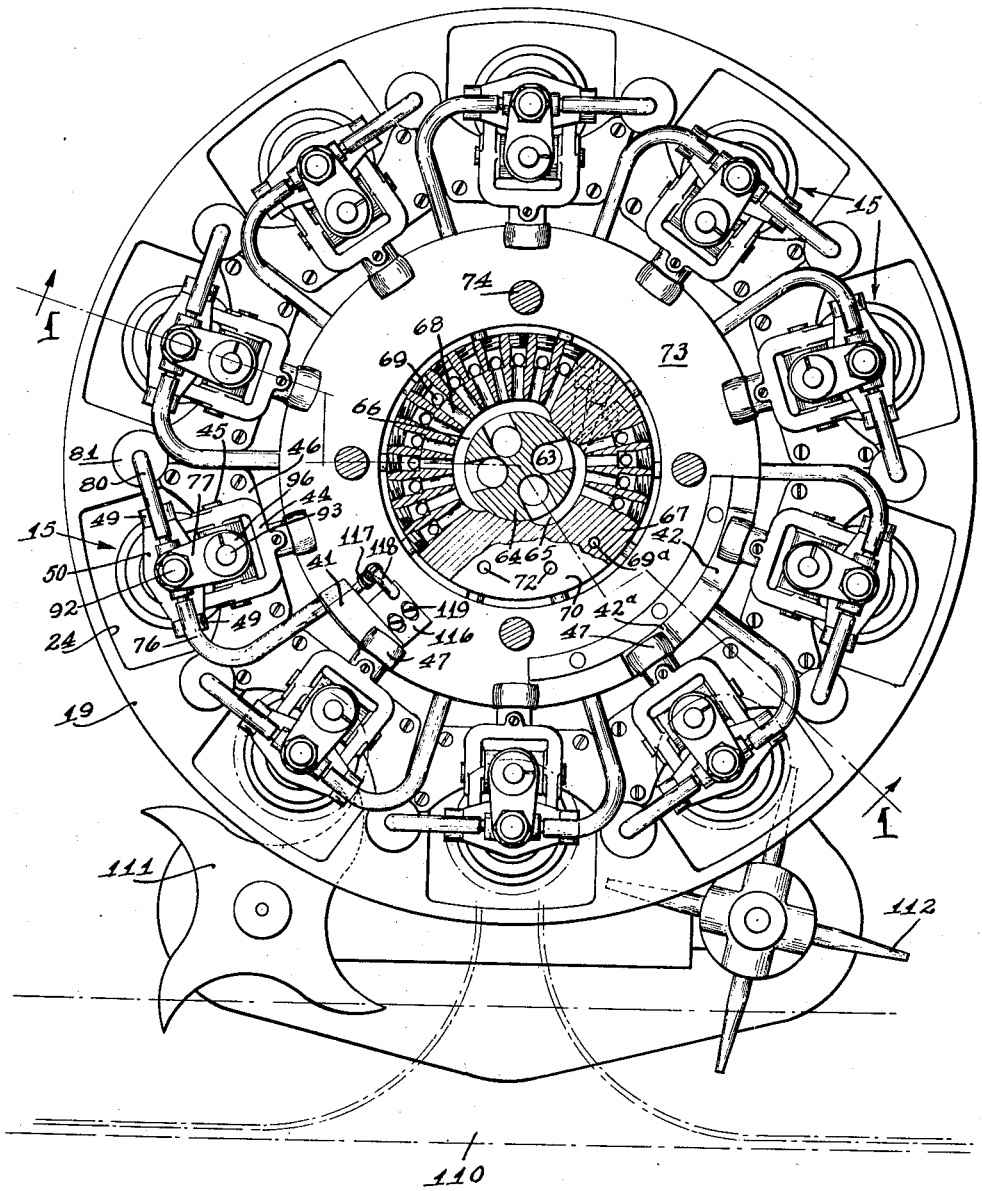
Fig. 2 is a sectional plan view with parts broken away, the section being at the line 2—2 on Fig. 1.
Figure 3:
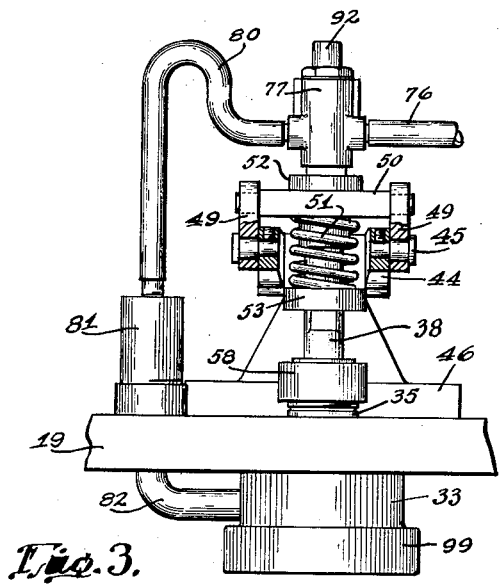
Fig. 3 is a front elevation, with parts in section, of a sealing head or unit.
Figure 4:
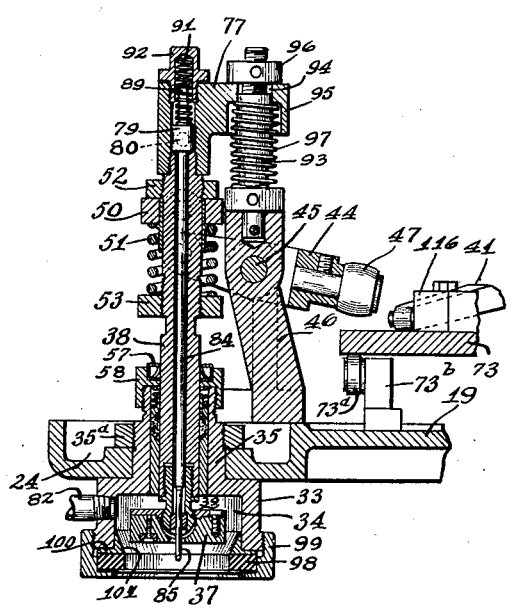
Fig. 4 is a sectional elevation of the same, the section being in a plane radial to the machine.

The vacuum system by which the jars are vacuumized, includes a pair of vacuum pipes 60 and 61 (Fig. 1) attached to a connector 62 at the top of the machine. The pipes open into vertical channels 63 which extend downward through a post 64 fixed to and forming an extension of the center column 14. Said post and column are secured together by a rod 64ª. The channels 63 open into discharging chambers 65 and 66 respectively, said chambers being formed in a stationary distributing head 67 surrounding the post 64. Each of the chambers 65 and 66, as shown in Fig. 2, extends circumferentially of the post 64 through a limited arc. Channels 68 radiate from the said chambers and communicate with vertical channels or ports 69 which extend downwardly therefrom through the distributor head 67.

A rotary plate 70 directly beneath and bearing against the distributor head 67, is connected by pins 71 to the upper end of the rotating carriage shaft 16 and is held up to the stationary distributing head 67 by springs 71'. Port openings 72 individual to the vacuumizing heads, extend through the plate 70. Each said port 72 is brought into register with the restricted channels 69 in succession as the carriage rotates for effecting a gradual drawing of the vacuum in the containers as hereinafter described.

A stationary cam ring 73 on which the cams 41 and 42 are mounted, is supported on rolls 73ª (Fig. 4) journaled on blocks 73ᵇ on the rotary platform 19. Posts 74 attached to the ring 73 extend upward through bearing sleeves formed on a stationary head 75 on the post 64. The cam ring is thus held against rotation but is adjustable up and down with the platform 19.

Vacuum lines individual to the sealing units, include hose pipes 76 attached to the plate 70 and opening into the ports 72. The pipes 76 extend to valve bodies 77 mounted on the upper ends of the chuck spindles 38. Each said valve body has a cylindrical opening 78 (Fig. 5) extending vertically therethrough in line with the spindle 38 and forming a valve chamber in which a cylinder valve 79 is mounted for up-and-down movement. The valve when lifted, opens the vacuum line which includes the pipe 76, a pipe 80 extending from the opposite side of the valve body 77 to a filter 81, and a pipe 82 extending from the filter to the vacuum chamber. When the valve 79 is lowered, it closes the port openings to the pipes 76 and 80.

The valve 79 is attached to the upper end of a valve stem or rod 84 which extends downward through a central bore in the spindle 38 and connector 39. The lower end portion 85 of the valve stem is of reduced diameter and extends through a bushing 86 in the ball connector 39 to provide a vacuum seal preventing leakage of air through the spindle 38. The rod 85 protrudes below the pusher plate 37 into position to be engaged by a jar cap and moved upwardly thereby for opening the valve 79 when a jar is lifted into position to be vacuumized.

The means for connecting the valve 79 with the stem 84 (Fig. 5) includes a ring 87 secured to the valve and a flanged collar 88 threaded on the valve spindle. The rod 89 forming an extension of the valve stem 84 has a screw-threaded connection with the latter and is formed at its lower end with a head 90 which provides an abutment for a light coil spring 91 mounted in the valve chamber. The spring is held under compression by a cap 92 attached to the valve body 77 and applies downward pressure to the valve for lowering it to closed position when a jar is lowered away from the chuck. The pull of the magnets 36 is sufficient to overbalance the opposing force of the spring 91 and the weight of the valve 79 and valve stem, and thereby hold the cap on the chuck until the cap is applied to the vacuumized jar.

A guide post 93 mounted on the standard 46 extends upwardly through an opening 94 in a lateral extension 95 of the valve body and serves to guide the latter as it moves up and down with the spindle 38. A stop nut 96 is threaded on the upper end of the post 93 and limits the upward movement of the spindle. A coil spring 97 is mounted on the post 93 and is held under compression between the valve body 77 and the standard 46. The spring serves to lift the valve body and its spindle when released from the control of the cams by which it is lowered.

A ring gasket 98 (Fig. 6) of rubber composition or the like, provides a seal between the vacuum bell 33 and a jar 25 while the latter is being vacuumized. This gasket is clamped in position by a clamping ring 99 threaded on the lower end of the bell 33. A ring 100 having an inner downwardly tapered wall surface 101 is clamped between the gasket and the lower face of the vacuum bell. A gasket 102 provides a seal between the ring 100 and the said bell.

Figure 10:
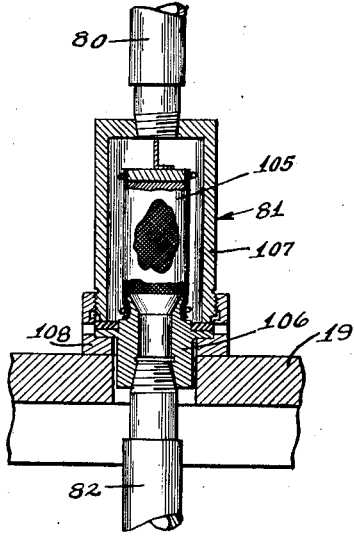
Fig. 10 is a sectional elevation of a filter.

The filter 81 (Fig. 10) serves to screen out any particles or granules of coffee or other material which may be drawn by suction from the container during the vacuumizing process, thereby preventing such material from being drawn through the suction lines beyond the screen. The filter includes a cylindrical screen 105 attached to a connector 106 threaded on the pipe 82. An outer casing 107 encloses the screen and is clamped to the connector by a clamping ring 108, permitting removal and emptying of the screen.

The jars 25 are conveyed to the machine on a traveling belt conveyor 110 (Fig. 2) and are transferred to the machine by a star wheel 111 which positions them on the platforms 26. After the jars are vacuumized and sealed, they are returned to the conveyor 110 by a star wheel 112.

Figure 7:
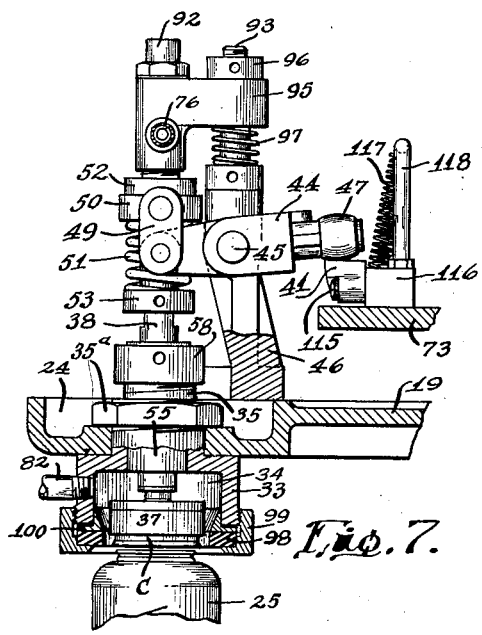
Fig. 7 is a part sectional elevation of a sealing unit with the chuck lowered and a jar lifted to bring the cap thereon into engagement with the chuck.
Figure 8:
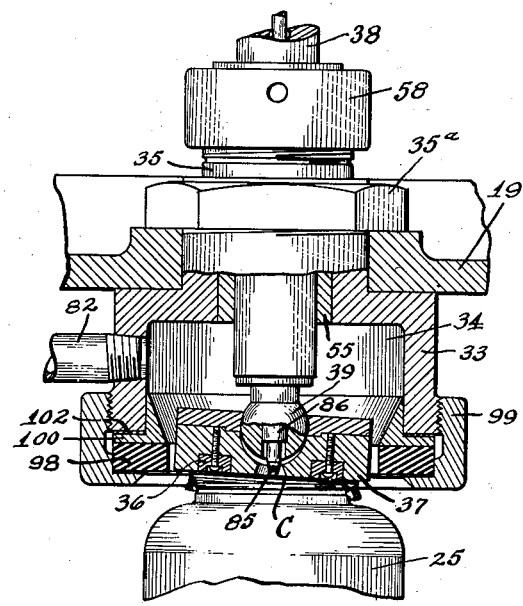
Fig. 8 is a fragmentary sectional view on a comparatively large scale, of a sealing head with the chuck lowered into engagement with a tilted cap as the jar moves upward.

The cam 41 (Figs. 2, 4, and 7) by which the chuck is lowered for picking up a cap, is spring-loaded, permitting it to yield under pressure of the cam follower roll if the chuck is forced upwardly, for example, by a jar above the standard height. The cam is connected by a pivot 115 to a block 116 mounted on cam ring 73. A coil spring 117 is connected at its opposite ends to a post 118 and the cam 41, the spring being under tension for holding the cam lifted to its operating position and permitting it to yield as just described. The block 116 is attached to the ring 73 by screws 119 extending through elongated slots in the block, permitting lengthwise adjustment of the block and cam.

*Operation*

The carriage is rotated continuously in a clockwise direction (Fig. 2) and a jar 25 is placed on each pedestal by the transfer wheel 111 at the receiving station. As the jar advances, the pedestal is lifted by the stationary cam track 30 to the Fig. 7 position in which it is a short distance beneath the vacuum bell 33. While the jar is being thus lifted, the stationary cam 41 operates through the lever 44 to lower the chuck spindle 38, thereby bringing the chuck into contact with the cap C which is seated loosely on the jar and causing the magnets 36 to grip the cap.

Figure 9:
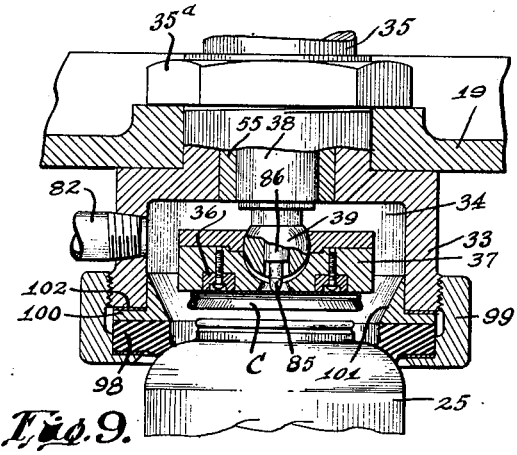
Fig. 9 is a similar view showing the jar lifted to seal the vacuum chamber and the cap withdrawn, permitting the jar to be vacuumized.

As the chuck approaches the cap, the latter strikes the detector rod 85 and lifts the valve stem and the valve 79, thereby opening the vacuum line through the valve body 77. If a jar is missing or there is no cap on the jar, then the valve 79 is not lifted and the vacuum line remains closed. If a jar and its cap are in place on the upwardly moving pedestal, the chuck 37 grips the cap before the jar has completed its upward movement, and the cam roll 47 passes the high point of the cam at this time, permitting the chuck and its spindle to be quickly lifted by the spring 97 to the position shown in Fig. 9 while the jar is completing its upward movement into sealing engagement with the gasket 98. The cap C is thus spaced above the jar a short distance, as for example, one eighth or one fourth of an inch, permitting a free escape of air from the jar when the air is exhausted from the vacuum chamber 34.

The ball and socket connection between the chuck and its spindle permits the chuck to adjust itself to the cap when the latter is in a tilted position on the jar. The jar is retained in its lifted position (Fig. 9) by the stationary cam 30 during the vacuumizing operation. As the sealing unit advances, the vacuum pipe 76 leading therefrom is brought into register with the ports 69 in the distributing head, thereby opening the pipe to the vacuum distributing chamber 66. These ports are small enough to restrict the flow of air therethrough, so that the vacuum produced in the suction chamber is built up gradually, thereby preventing the contents of the jar from being drawn out by suction. The ports 69 may be graduated in size.

After the sealing unit has passed beyond the range of the vacuum chamber 66, from which air is exhausted through the pipe 60, it is brought within the range of the vacuum chamber 65 which may be vacuumized to a higher degree through the suction pipe 61 to produce a final high degree of vacuum within the jar. When the jar is vacuumized, the chuck or pressure plate 37 is lowered to force a cap into sealing engagement with the jar. This lowering is effected by the cam 42 operating through the lever 44 and spring 51. As soon as the cap is thus sealed to the jar, the vacuum sealing chamber line is opened to atmospheric pressure through a port 69ª (Fig. 2). The pusher plate 37 is then given an additional downward movement by a high portion 42ª of the cam 42. This serves as a positive means for disconnecting the jar from the sealing gasket 98. The cam 30 is shaped to permit this lowering of the jar and its supporting pedestal, and then a continued downward movement of the pedestal separates the jar from the chuck. The jar is then transferred by the star wheel 112 to the conveyor 110.

Modifications may be resorted to within the spirit and scope of our invention.

We claim:

1. A vacuum sealing machine comprising a downwardly opening vacuum bell, a pedestal therebeneath forming a support for an open-mouthed container, means for moving the pedestal upward and thereby bringing the container into sealing engagement with said bell, a magnetic chuck movable up and down within said bell, means for lowering the chuck and causing it to grip a closure cap seated loosely on the container and lift said cap away from the container, suction means for exhausting air from the said bell and container, a detector comprising a rod movable with the chuck and also movable relatively to the chuck, said rod being positioned to be engaged by a said cap on the container as the chuck is lowered, and a valve operatively connected to said rod and controlling the application of suction to said bell and container.

2. A vacuumizing and sealing machine comprising a downwardly opening bell providing a vacuum chamber, a pedestal beneath said bell, means for lifting and lowering the pedestal and thereby lifting and lowering a container supported thereon to and from sealing engagement with the bell, a chuck within said chamber comprising means for gripping a cap seated on the container, a chuck spindle having a universal joint connection with the chuck, means for lifting and lowering the chuck spindle, means providing a vacuum line extending to said chamber, a valve in said line, and means connecting the valve to the spindle for up and down movement therewith to positions for opening and closing the vacuum line.

3. A vacuumizing and sealing machine comprising a downwardly opening bell providing a vacuum chamber, a pedestal beneath said bell, means for lifting and lowering the pedestal and thereby lifting and lowering a container supported thereon to and from sealing engagement with the bell, a chuck within said chamber, comprising means for gripping a cap supported on the container a chuck spindle having a universal joint connection with the chuck, means providing a vacuum line extending to said chamber, a valve in said vacuum line, a detector rod slidably mounted in said chuck and protruding into position to be operated by a cap on the said container as the chuck approaches the cap, and a valve in said vacuum line connected to said detector rod.

4. A vacuum sealing machine comprising in combination, a vacuum bell, a support to which the bell is attached, a chuck within said bell comprising means for gripping a closure cap for a container, a chuck spindle connected to the chuck and mounted for reciprocating movement relative to said bell, a valve body connected to said spindle, a valve in said body, a valve stem connected to the valve, said spindle and chuck having an opening extending lengthwise of the spindle and through the chuck, said valve and stem being mounted for reciprocating movement lengthwise of said spindle with the said valve stem extending through said opening and protruding beyond said chuck, and a suction line extending through said valve body to said bell and controlled by said valve.

5. A vacuum sealing machine comprising in combination, a vacuum bell, a support to which the bell is attached, a chuck within said bell comprising means for gripping a closure cap for a container, a chuck spindle connected to the chuck and mounted for reciprocating movement relative to said bell, a valve body connected to said spindle, a valve in said body, a valve stem connected to the valve, means for moving a container with a cap thereon into operative relation to said bell, said valve stem projecting into the path of said cap as the container is brought to said position, means providing a suction line extending to said bell, said valve being arranged to control said suction line, and means for reciprocating said spindle.

6. A vacuum sealing machine comprising a carriage rotatable about a vertical axis, a downwardly opening vacuum bell mounted on the carriage, a chuck mounted within said bell comprising means for gripping a closure cap for a container, a chuck spindle connected to the chuck and extending upwardly therefrom and mounted for up-and-down movement on the carriage, a valve body mounted on the spindle, a valve in said body, a vertical valve stem connected to the valve, said spindle having a central bore through which the valve stem extends downwardly with the stem protruding below the chuck, the valve and stem being movable up and down relative to the said spindle, a spring holding the valve lowered, means for moving the spindle and chuck up and down, and a suction line extending through said valve body and to said bell and controlled by said valve.

7. A vacuum sealing machine comprising a carriage rotatable about a vertical axis, a downwardly opening vacuum bell mounted on the carriage, a chuck mounted within said bell comprising means for gripping a closure cap for a container, a chuck spindle connected to the chuck and extending upwardly therefrom and mounted for up-and-down movement on the carriage, a valve body mounted on the spindle, a valve in said body, a vertical valve stem connected to the valve, said spindle having a central bore through which the valve stem extends downwardly with the stem protruding below the chuck, the valve and stem being movable up and down relative to the said spindle, a spring holding the valve lowered, spring means for holding the chuck and spindle in their lifted position, cam means operated by the rotation of the carriage for lowering the chuck and spindle, and a suction line extending through said valve body to the vacuum bell and controlled by said bell.

8. A vacuum sealing machine comprising a carriage mounted for rotation about a vertical axis, a chuck comprising means for gripping a closure cap, said chuck being connected to the carriage for rotation therewith, a chuck spindle connected to the chuck, a stationary cam, means on the carriage operated by said cam for moving the spindle and chuck in one direction, spring means for moving the spindle and chuck in the opposite direction, and spring means holding the said cam in operative position and permitting it to move to an inoperative position when an abnormal resistance to the movement of the spindle and chuck by the cam operating means is encountered.

9. A machine for vacuumizing said sealing containers comprising a downwardly opening vacuum chamber, a support therebeneath for a container, means for moving said support and a container thereon upwardly relative to the vacuum chamber and sealing the container to said chamber, a chuck positioned over the said support, said chuck comprising cap gripping means, means for causing a downward movement of the chuck during said upward movement of the said support and thereby bringing the chuck into position to grip a cap supported loosely on the container, means for then moving the chuck upwardly relative to the support and the container thereon during said upward movement of the support and container and at a more rapid rate than the support is moving upward and thereby withdrawing the cap from the container, means for exhausting air from the vacuum chamber and container while the cap is held spaced above the container by the chuck, means for then moving the chuck and cap downward while said support is held in its up position with the container sealed to said chamber and thereby sealing the container by the downward movement of the chuck relative to the support and container by which the chuck forces the cap into sealing engagement with the vacuumized container, and interconnected mechanism between the said means for moving the chuck and the means for moving the said support for causing said movements in the order above set forth.

10. The machine as set forth in claim 9 including means for opening the vacuum chamber to atmospheric pressure while the container is sealed thereto, and means for giving an added downward movement to the chuck after said sealing of the cap to the container and said opening of the vacuum chamber, whereby the chuck operates positively to disengage the container from the vacuum chamber.

11. A vacuum sealing machine comprising a vacuum chamber, a support for an open-mouthed container positioned below the vacuum chamber and mounted for up and down movement relative to said chamber for moving the container into and out of sealing contact with the vacuum chamber, a vacuum line extending to said chamber through which air is exhausted from the chamber for vacuumizing the container, a chuck mounted for up and down movements within the vacuum chamber and comprising means for gripping a cap loosely seated on the container when the chuck is lowered and for lifting the cap from the container when the chuck moves upward, means for effecting said up and down movements of the chuck, a detector comprising a rod mounted for up and down movement with the chuck, spring means providing a connection between the rod and chuck and yieldingly holding the rod in a position in which it protrudes downwardly below the chuck, said rod being movable upwardly relatively to the chuck by a closure cap on the container when the chuck is lowered and said rod contacts with the said cap, and a valve in said vacuum line connected to said rod and movable by the rod into position to open the vacuum line when the rod is moved upwardly relatively to the chuck, the valve being held by the said rod in closed position while the rod is in said protruded position.

12. A vacuum sealing machine comprising a downwardly open vacuum bell, a pedestal therebeneath forming a support for an open-mouthed container, means for moving the pedestal upward and thereby bringing the container into sealing engagement with said bell, a magnetic chuck mounted for up and down movement within said bell, means for lowering the chuck and causing it to grip a closure cap seated loosely on the container, means for then lifting the chuck and causing it to lift said cap away from the container, suction means for exhausting air from the said bell and container including a suction line extending to the bell, a detector comprising a rod mounted for up and down movement with the chuck and for up and down movement relative to the chuck between a protruded position in which the rod projects downwardly below the chuck and a retracted position, a valve in said suction line and connected to said detector rod for movement to a closed position when said rod is moved to its said protruded position and movable to open the suction line when the detector rod is retracted, and spring means connecting said rod to the chuck and yieldingly holding said rod in its downward position and permitting the rod to be retracted by the said cap on the container as the latter is moved into sealing engagement with the bell.

13. A vacuum sealing machine comprising a vacuum bell, a support in which the bell is mounted, a chuck within said bell, said chuck comprising means for gripping a closure cap for a container, a chuck spindle carrying the chuck and mounted for reciprocating movement within said support, means providing a suction line extending to said bell, a valve body through which the suction line extends, said valve body being connected to said spindle for reciprocation therewith, a valve in said body controlling said suction line, means for yieldingly connecting the valve to the spindle for reciprocating movement therewith, means for supporting a container and moving it into operative position relative to said vacuum bell, and a valve operating device connected to the valve for movement therewith and extending into position to be engaged and operated by a cap on the container during said movement of the container.

14. A vacuum sealing machine comprising a vacuum bell, a support in which the bell is mounted, a chuck within said bell, said chuck comprising means for gripping a closure cap for a container, a chuck spindle carrying the chuck and mounted for reciprocating movement within said support, means providing a suction line extending to said bell, a valve body through which the suction line extends, said valve body being connected to said spindle for reciprocation therewith, a valve in said body controlling said suction line, means for supporting a container and moving it into operative position relative to said vacuum bell, and a valve stem connected to and carrying said valve and mounted for reciprocation lengthwise of said chuck spindle, said valve stem extending into position to be engaged and operated by a cap on the container during said movement of the container.

15. A machine for vacuumizing and sealing containers, comprising a carriage mounted for rotation about a vertical axis, a downwardly opening vacuum chamber on the carriage, a support for a container, said support mounted for up-and-down movement on the carriage and positioned beneath the vacuum chamber, a stationary cam track, means providing operating connections between the cam track and said support for causing lifting of the support as the carriage rotates and thereby lifting a container thereon into sealing engagement with the vacuum chamber, a chuck mounted for up-and-down movement on the carriage over the said support, said chuck comprising cap gripping means, means cooperating with the carriage for causing downward movement of the chuck during said upward movement of the said support, and thereby bringing the chuck into position to grip a cap supported loosely on the container, means for then moving the chuck upwardly relative to the support and the container thereon during said upward movement of the support and container and at a more rapid rate than that at which the support is being moved upward and thereby withdrawing the cap from the container, means for exhausting air from the vacuum chamber and container while the cap is held spaced above the container by the chuck, means for then moving the chuck and cap downward while the said support is held by said cam track in its lifted position in which the container is sealed to said chamber and thereby sealing the cap to the container by the downward movement of the chuck relative to the support and container, and means for thereafter opening the vacuum chamber to atmosphere.

JOHN HOHL.
HERBERT A. BARNBY.
JACK M. WHEATON.

REFERENCES CITED

The following references are of record in the file of this patent:

UNITED STATES PATENTS

| Number | Name | Date |
| --- | --- | --- |
| 842,329 | Landsberger et al. | Jan. 29, 1907 |
| 1,294,820 | Middleton | Feb. 18, 1919 |
| 2,120,272 | Williams et al. | Jan. 14, 1938 |
| 2,174,420 | Kantor | Sept. 26, 1939 |
| 2,309,568 | Bell | Jan. 26, 1943 |
| 2,343,104 | Williams | Feb. 29, 1944 |